Dec. 7, 1965 G. L. WIEBER 3,221,588
DRILL SCREW AND AN ASSEMBLY INCLUDING THE SAME
Filed March 5, 1962
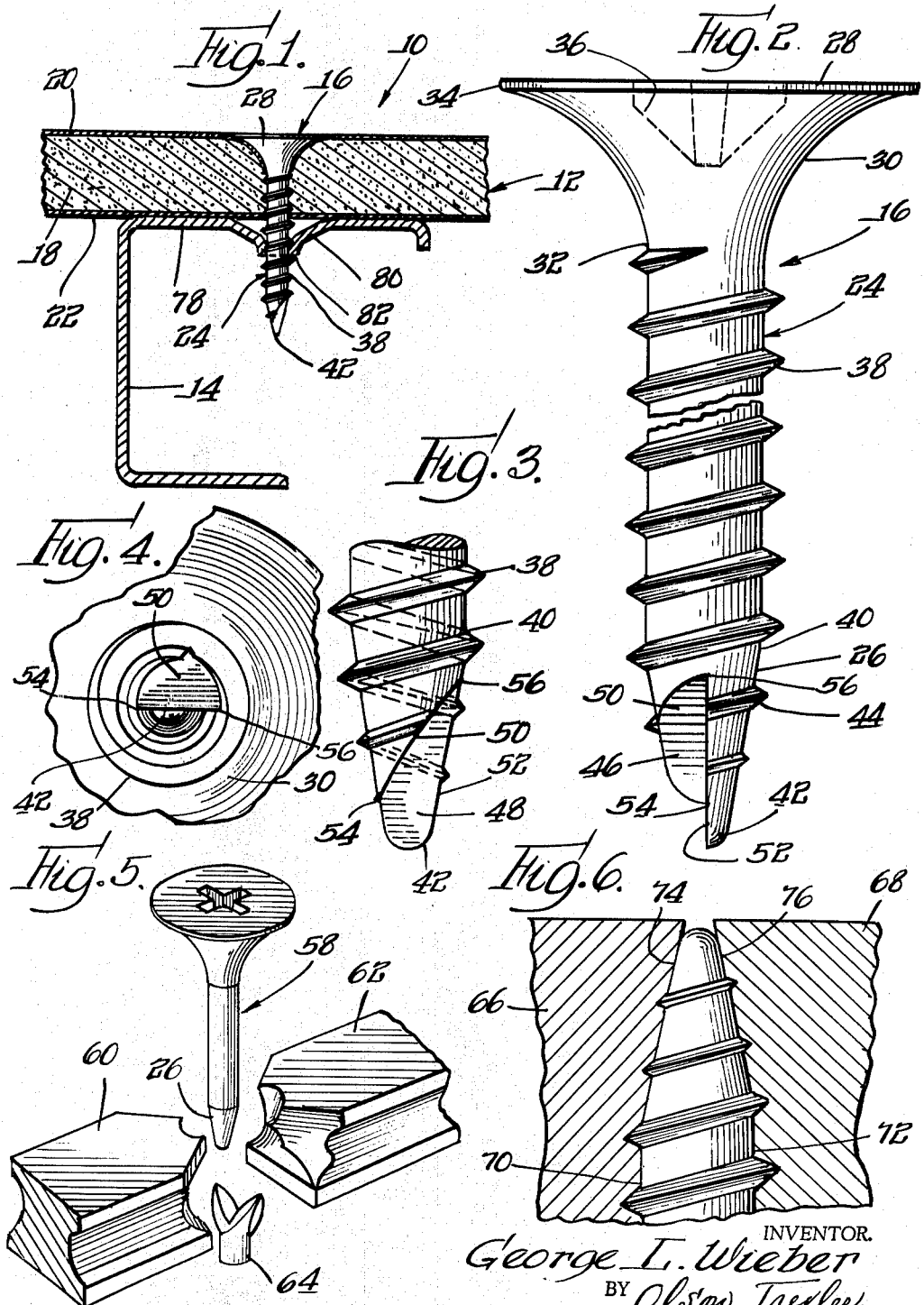
INVENTOR.
George L. Wieber
BY Olson, Trexler,
Wolters & Bushnell
attys.

United States Patent Office 3,221,588
Patented Dec. 7, 1965

3,221,588
DRILL SCREW AND AN ASSEMBLY
INCLUDING THE SAME
George L. Wieber, Mount Prospect, Ill., assignor to Illinois
Tool Works Inc., Chicago, Ill., a corporation of Delaware
Filed Mar. 5, 1962, Ser. No. 177,627
6 Claims. (Cl. 85—47)

The present invention relates to a novel drill screw, and to a novel assembly or wall structure including such a screw.

The present invention contemplates a wall assembly or the like including plasterboard secured to a support member or stud. It has heretofore been proposed to utilize screw elements for securing plasterboard to studs, and certain previously suggested screw elements have proven to be generally satisfactory and highly commercially successful. However, the present invention contemplates further improvements in such screw elements and wall assemblies particularly for installations in which plasterboard or other wall covering is to be secured to metal studs.

As will be understood, when a screw is driven to secure a wallboard or the like to a metal stud, the screw usually passes easily through the wallboard as compared with its subsequent entry into the metal stud. When the screw element initially engages the metal stud or member after passing through the wallboard, there is frequently a tendency for the tip of the screw element to slide over the surface of the metal stud before beginning to penetrate the metal. Such a sliding action is highly undesirable since it causes the screw element to tilt or twist in the wallboard in a manner which may cause the aperture formed by the screw element through the wallboard to become enlarged or damaged so that the screw element cannot solidly and reliably secure the wallboard to the stud.

Metal support members or studs for use in wall structures of the type contemplated herein are frequently formed from relatively thin or sheet material. When such studs are used, difficulty may be encountered in tightening screw elements sufficiently to draw and retain the wallboard firmly against the surface of the stud without pulling the screw element back through the sheet metal stud or stripping the threads formed in the sheet metal.

An important object of the present invention is to provide a novel drill screw which is constructed for promoting starting into a workpiece such as a metal stud.

A further object of the present invention is to provide a novel drill screw particularly adapted for securing wallboard and the like to a metal stud, and constructed so as to minimize any possibility of the screw slipping or skating over the surface of the stud, and for promoting rotation of the screw about its own axis during starting into the metal stud so as to reduce any possibility of injury to the wallboard or other workpiece which is being secured to the support member or stud.

Still another object of the present invention is to provide a novel screw element which is constructed for forming an aperture in a support member or metal stud in a manner for obtaining engagement between the screw member and the stud along an axial length of the screw member greater than the thickness of the stud for improving the holding power of the screw.

A further object of the present invention is to provide a novel assembly including a workpiece such as wallboard and the like secured to a support member such as a metal stud in a manner which assures that the workpiece will be continually maintained positively and aggressively against the support member.

Still another object of the present invention is to provide a novel method for forming screw elements whereby to facilitate production of screw elements having characteristics described above.

Other objects and advantages of the present invention will become apparent from the following description and the accompanying drawings wherein FIG. 1 is a partial sectional view showing an assembly incorporating features of the present invention, FIG. 2 is an enlarged elevational view showing a screw element constructed in accordance with features of the present invention, FIG. 3 is a fragmentary elevational view showing a portion of the screw element turned 90° from the position shown in FIG. 2, FIG. 4 is an entering end view of the screw element, FIG. 5 is a perspective view showing one step in the process of manufacturing screw elements in accordance with features of the present invention; and FIG. 6 is a fragmentary partial sectional view showing a further step in the production of screw elements in accordance with the present invention.

Referring now more specifically to the drawings wherein like parts are designated by the same numerals throughout the various figures, an assembly 10 incorporating features of the present invention is shown in FIG. 1. In the particular embodiment shown for the purpose of illustrating the present invention, the assembly 10 comprises a workpiece or wallboard 12 secured to a metallic support or stud member 14 by means of one or more screws 16. In this embodiment the wallboard 12 is in the form of a piece of plasterboard having a central relatively thick body 18 of plaster material. Opposite surfaces of the plaster body are covered by sheets 20 and 22 of paper. It is to be understood that certain features of the present invention may be used in other types of assemblies in which various workpieces are secured to support members.

As shown best in FIG. 2, the screw element 16 comprises an elongated shank section 24. A leading end of the shank section 24 joins an entering end portion 26 which will be described more in detail below, and a trailing end of the shank section 24 is integral with an enlarged head portion 28.

The head portion 28 is formed so that it may be substantially embedded in the wallboard when the screw element is applied to the work structure as shown in FIG. 1. Furthermore the head structure is formed so that injury to the wallboard and tearing of the outer paper cover or sheet 20 is prevented. In this connection it is to be noted that the head portion 28 is provided with a generally downwardly facing or work clamping surface 30 which flares relatively gradually from a junction 32 with the shank section 24. The surface 30 is further formed so that, at its upper and outer end, it intersects a peripheral or edge surface 34 of the head in a substantially radially extending direction. In other words, the upper and outer end portion of the surface 30 flares outwardly at a substantially greater angle with respect to the longitudinal axis of the screw than the inner and lower end of the surface 30. It has been found that with this structure the head portion is adapted to compress the plaster material and to spin or iron the paper sheet 20 downwardly as shown in FIG. 1 without injuring the wallboard or tearing the paper.

In this connection it is further to be noted that the trailing section of the head portion defined by the peripheral surface or edge 34 is of relatively small axial extent as compared with the leading section of the head portion defined by the surface 30 so that the railing section of the head portion may be completely embedded within the wallboard. However, the trailing section of the head is formed so that the peripheral edge or surface 34 has sufficient axial extent and slightly rounded junctions with the surface 30 and the upper or end surface of the head whereby to preclude any possibility of the peripheral surface 34 acting as a knife edge and cutting the paper sheet 20.

The head portion 28 is provided with a central recess 36 adapted to accommodate a suitable driving tool, not shown. This recess is formed entirely within the periphery of the head portion and does not interrupt the surfaces 30 and 34. Thus these surfaces are smooth and present no sharp edges which might cut or otherwise injure the workpiece or wallboard.

The shank section 24 is preferably of substantially uniform diameter between the head portion and the entering end portion 26. A helical thread 38 is formed on the shank section 24 which thread has a plurality of spaced apart convolutions which are also preferably of substantially uniform diameter throughout the length of the section 24. When the screw element is driven through the wallboard 12, the thread 38 forms a complementary thread, in the plaster body 18. At least a portion of the plaster material which is displaced to form such complementary threads is compressed into the spaces between the convolutions of the thread 38 whereby the portion of the plaster body in the immediate vicinity of the screw element is made denser and stronger for promoting a more secure connection between the wallboard and the screw element.

The entering end portion 26 of the screw element is substantially conically formed and tapers from a junction 40 with the tank section 24. It is important to note that in accordance with a feature of the present invention a tip section 42 of the entering end portion is rounded and is substantially in the form of a segment of a sphere having its center on the longitudinal axis of the screw. The radius of this sphere is substantial and the screw is thus provided with a partial ball tip as distinguished from a sharply pointed tip. It has been found that this ball tip construction provides the device with greater strength and resistance to breakage, and also promotes starting of the screw into the metal support member while minimizing any tendency of the screw to slide or skate over the surface of the support member.

The entering end portion 26 of the screw is provided with a helical thread 44 which extends from a junction with the thread 38 toward the tip section. As shown in FIGS. 2, 3 and 6, the thread 44 progressively decreases in height and terminates well short of the rounded tip section 42. Preferably the terminal point of the thread 44 is spaced axially from the extreme tip of the section 42 a distance substantially equal to the thickness of the material forming the support member or metal stud 14.

A slot 46 is formed in the entering end portion 26 of the screw, which slot is defined by substantially right angularly disposed side surfaces 48 and 50. The flat surface 48 is substantially parallel to a diametral plane and may be substantially in said plane or slightly offset therefrom rearwardly with respect to a direction of tightening rotation of the screw. The surface 48 intersects the periphery of the entering end portion 26 to provide a cutting edge 52 which functions for drilling an aperture through the support member or sheet metal stud. As shown in FIGS. 2 and 3, the surface 50 of the slot intersects one side of the entering end portion 26 at a point 54 which is located at approximately the same position axially of the screw as the start of the thread portion 44. The opposite end of the surface 50 and the upper terminal end of the cutting edge 52 are located at a point 56 on the tapering or conical entering end portion 26 and well below the junction 40 with the shank section 24. In other words, the root diameter of the screw at the point 56 is less than the root diameter of the shank section 24.

Screw elements of the present invention are formed in accordance with a process partially shown in FIGS. 5 and 6. In FIG. 5 there is shown a screw blank 58 having its head and shank portions formed but its shank portion unthreaded. In addition FIG. 5 shows complementary die members 60 and 62 which are adapted to be moved together in a known manner for pinching an element 64 from an end portion of the screw blank shank and thereby forming the shank with a tapered or conical entering end portion.

After the screw blank has been formed in the manner indicated in FIG. 5, it is rolled between complementary thread rolling dies 66 and 68 as shown in FIG. 6. It is noted that the dies 66 and 68 are not only provided with complementary ribs 70 and 72 for forming the helical thread convolutions on the blank, but they are also provided with converging and properly formed surfaces 74 and 76 adapted to engage the entering end portion of the screw. The substantially conical entering end portion of the screw blank formed by the pinchpointing dies 60 and 62 may be initially substantially eccentrically formed or deflected with respect to the longitudinal axis of the screw shank as a result of numerous variables in the pinchpointing dies, the machine in which the dies are mounted and the screw blank being processed. Thus the surfaces 74 and 76 of the rolling dies serve to manipulate and form the tapered or conical entering end portion 26 and its ball tip so that these elements of the screw are positively axially aligned with the shank section 24 and the thread convolutions formed thereon. This positive alignment of the entering end portion, the ball tip and the shank with each other and with the head portion and driving tool accommodating recess 36 aids in reducing or eliminating any tendency of the screw element to wobble while it is being driven into the work structure so that injury to the workpiece or wallboard is avoided.

After the screw blank has been rolled in the manner just described, the entering end portion is subjected to the action of a rotary saw or other suitable cutter so that the slot 46 is cut therein.

When the structure shown in FIG. 1 is assembled, the workpiece or wallboard 12 is first positioned against a flange 78 of the metal support member or stud 14. Then the screw element 16 is driven by means of a suitable tool, not shown, through the wallboard and against the flange 78. As previously indicated the ball tip portion 42 which is positively centered with respect to the longitudinal axis of the screw presents a relatively strong and well supported cutting edge which starts easily into the metal of the flange 78 without sliding across the surface of the flange. It has been found that the starting characteristics of a screw having the aforementioned ball tip are significantly improved as compared with starting characteristics of a similar screw having a sharply pointed tip. The reasons for this significant improvement are not fully understood, but it is believed that the improvement results, in part, from the fact that the cutting edge 52 along the rounded or ball tip portion initially extends substantially laterally from the longitudinal axis of the screw so that it is positioned for cutting or scrapping a relatively broad area of easily removable surface material from the flange 78 of the support member 14. When such relatively easily removable surface material has been cut away, a depression will have been formed in the flange 78 which will thereafter prevent the screw from slipping laterally along the surface of the flange.

As driving of the screw element through the flange 78 continues, an annular section 80 of the flange will be deflected and partially extruded downwardly as shown in FIG. 1 in somewhat exaggerated form, and an internal margin 82 of the annular section 80 will be curled downwardly. The arrangement of the slot 46 so that the upper terminal point 56 of the cutting edge 52 is substantially below the maximum diameter portion of the screw shank prevents the downwardly curled marginal portion 82 from being cut away. In fact it is contemplated that the slot may be modified for shorting the cutting edge 52 and thus locating its upper terminal point 56 farther down on the tapering entering end portion for further promoting and extending the downwardly curled marginal portion 82 of the support flange. In any event the arrangement is such that the downwardly curled portion 82 is in engagement with the screw element along a length thereof greater than the thickness of the flange 78 whereby improved holding power and resistance to stripping is obtained without increasing the thickness of the flange and thereby increasing the cost of the assembly. This increased holding power and resistance to stripping further facilitates tightening of the screw for drawing wallboard firmly against the outer surface of the flange 78 and for forcing the head portion of the screw into the wallboard in the manner shown.

When the screw element is fully applied as shown in FIG. 1, it is placed under substantial tension. This force is, of course, transmitted to the downwardly reflected or conical annular portion 80 of the flange 78. The inherent resiliency of the annular portion 80 continuously urges the screw element downwardly as viewed in FIG. 1 whereby to provide a continuing resilient force causing the head of the screw element to clamp the wallboard firmly against the support member.

While the preferred embodiment of the present invention has been shown and described herein, it is obvious that many details may be changed without departing from the spirit and scope of the appended claims.

The invention is claimed as follows:

1. A screw of the type described including a cylindrical shank, a head integral with the trailing end of said shank, a tapering entering end portion coaxial with said cylindrical shank terminating in a penetrating portion, said penetrating portion formed as a surface of revolution generated by a half circle with the axis of generation coincident with the axis of said shank, a section of said penetrating portion being relieved on the axis of said shank to form a recess extending from the terminal end of said penetrating portion at least to a point above the center of said half circle, the remaining penetrating end portion defining substantially one-quarter of a sphere.

2. A device of the type claimed in claim 1 wherein said recess is defined by a substantially flat wall intersecting a peripheral surface of said entering portion, the intersection between said wall and said peripheral surface present a cutting edge extending from a terminal end of said penetrating portion and terminating short of a trailing end of said tapering entering end portion.

3. A screw as defined in claim 2 wherein said recess is further defined by a second wall extending transversely of and intersecting said first mentioned wall, the intersection between said walls extending from an uppermost end of said cutting edge across said entering end portion and intersecting a peripheral surface of the entering end portion generally diametrically oppositely from said cutting edge and at a point spaced axially above said extremity of said quarter sphere.

4. A screw as defined in claim 3 wherein said entering end portion includes a helical thread intersected by said cutting edge, said threaded section starting at a point axially spaced upwardly from the center of the half circle forming said quarter sphere.

5. A screw as defined in claim 4 wherein said second wall intersects the peripheral surface opposite said cutting edge on the tapering surface of said entering end and said helical thread also commences on the tapering surface of said entering end portion and both are axially offset from the rounded surface of said quarter sphere.

6. An assembly comprising a support member presenting a sheet metal section, a workpiece disposed against said sheet metal section, and a screw element including a shank portion extending through said workpiece and said sheet metal section and a head portion integral with said shank portion and retaining said workpiece against said sheet metal section, said shank portion having a first section of substantially uniform diameter throughout and a tapering entering end portion, thread convolutions on said first shank section and extending along said entering end portion and terminating short of the free extremity of said entering end portion, said entering end portion terminating in a tip substantially in the form of a segment of a sphere having its center substantially on the longitudinal axis of the screw element, means providing a cutting edge extending from said tip of the entering end portion toward and terminating substantially short of said first section of the shank portion, said means providing said cutting edge including a recess formed in said entering end portion and removing sufficient material for locating said tip substantially entirely at one side of a diametral plane, said thread convolutions starting on said entering end portion at a point axially spaced from said tip, said thread increasing gradually from a substantially zero thread height at said point to a predetermined maximum thread height along said first shank section, said sheet metal section of said support member having a predetermined thickness, said sheet metal section further including an annular portion having an outer margin with a diameter substantially greater than the maximum diameter of said thread convolutions and surrounding said screw shank portion and being dished away from said workpiece, said dished annular portion defining a hollow beneath said workpiece, said annular portion including an axially extending inner margin having a maximum diameter substantially less than said diameter of said outer margin and being of greater axial extent than said predetermined thickness, said inner margin engaging said screw member for more securely retaining the screw member, said annular dished portion being placed under compression when said screw element is tightened and serving to provide a resilient force urging the head portion of the screw element and thus the workpiece toward said sheet metal section.

References Cited by the Examiner

UNITED STATES PATENTS

| | | | |
|---|---|---|---|
| 335,131 | 2/1886 | Jones | 10—10 |
| 1,169,641 | 1/1916 | Hedden | 50—319 |
| 1,764,053 | 6/1930 | Reed et al. | 10—10 |
| 2,015,159 | 9/1935 | Rosenberg | 85—41 |
| 2,605,867 | 8/1952 | Goodwin. | |
| 2,859,930 | 11/1958 | Brunsting et al. | 151—41.75 |
| 2,871,752 | 2/1959 | Stern | 85—47 |
| 3,056,234 | 10/1962 | Nelsson et al. | 50—319 |
| 3,094,895 | 6/1963 | Broberg | 85—47 |

FOREIGN PATENTS

| | | |
|---|---|---|
| 50,995 | 1/1910 | Switzerland. |

CARL W. TOMLIN, *Primary Examiner.*

EDWARD C. ALLEN, *Examiner.*